(12) United States Patent
Bogdan et al.

(10) Patent No.: US 6,216,435 B1
(45) Date of Patent: Apr. 17, 2001

(54) CONNECTING CHAIN LINK

(75) Inventors: Zvonimir Bogdan, Abtsgmünd; Hans-Jürgen Scherle, Aalen, both of (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 09/525,495

(22) Filed: Mar. 15, 2000

(30) Foreign Application Priority Data

Mar. 19, 1999 (DE) .............................. 199 14 016

(51) Int. Cl.⁷ .................................... F16G 13/06

(52) U.S. Cl. .................................... 59/85; 59/86

(58) Field of Search .................. 59/78, 84, 85, 59/86, 87, 88

(56) References Cited

U.S. PATENT DOCUMENTS

| 4,505,103 | * | 3/1985 | Dalferth et al. ............... 59/85 |
| 4,706,451 | * | 11/1987 | Stromberg et al. ............ 59/85 |

FOREIGN PATENT DOCUMENTS

| 3710047 | * | 10/1988 | (DE) ............... 59/85 |
| 3916284 | * | 11/1990 | (DE) ............... 59/85 |
| 4333261 |   | 10/1994 | (DE) . |

* cited by examiner

Primary Examiner—David Jones
(74) Attorney, Agent, or Firm—Mark P. Stone

(57) ABSTRACT

In the case of a connecting chain link having two connecting-link parts (1, 2) which are locked in place in the closed position by means of a bolt-shaped locking element (12) which rests in a holder (11) formed by the connecting-link parts (1, 2), the locking element (12) has, in addition to a central spring lock washer (19) which is used to secure its axial position, two further spring lock washers (23, 24) which are arranged in the region of its end and prevent tilting movements of the locking element (12) in the holder (11).

14 Claims, 1 Drawing Sheet

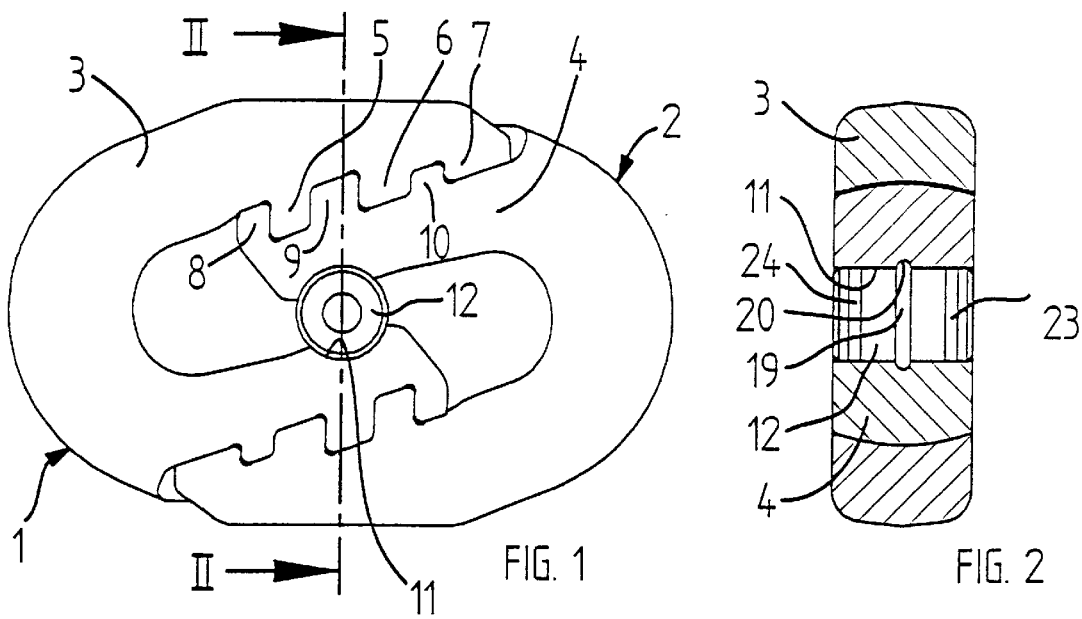
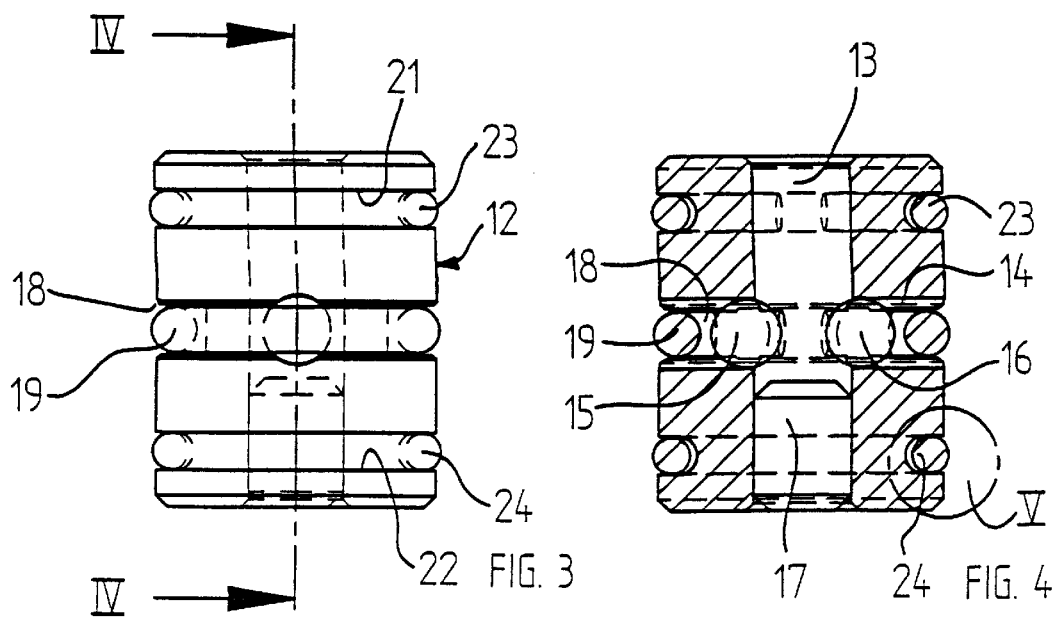
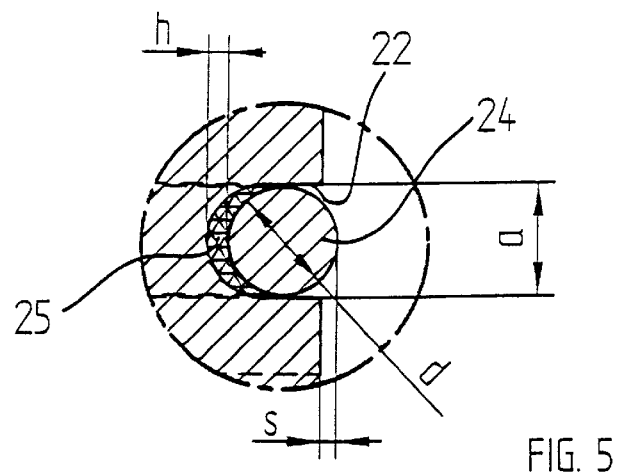

CONNECTING CHAIN LINK

BACKGROUND OF THE INVENTION

The invention relates to a connecting chain link having two connecting-link parts which are locked in place in the closed position by means of a bolt-shaped locking element, which is guided in an at least partially cylindrical holder formed by the connecting-link parts, and is secured against axial displacements by at least one locking member which is arranged in its central region and can be pressed into a slot in the holder.

A connecting chain link of the abovementioned type is disclosed in DE 43 33 261 C1. In this connecting chain link, in order to secure the axial position of the locking element use is made of two spring lock washers which are pressed, with the insertion of balls, into a slot in the holder by means of a clamping sleeve which can be driven into a central hole in the locking element. As experience has shown, the locking element of the known connecting link has a tendency to tilt in its holder, the size of the tilting movements depending on the manufacturing tolerances and on the particular operating conditions. Although these tilting movements are small, particularly with the connecting link being novel, they encourage wear of the locking element and this may have a negative effect on the service life of the connecting chain link.

SUMMARY OF THE INVENTION

The invention is based on the object of providing a connecting chain link of the type under consideration, in which tilting movements of the locking element about a transverse axis running perpendicularly to its longitudinal axis are eliminated. According to the invention, this object is achieved by the locking element having in the vicinity of its two ends a respective groove which is provided, in the region of its bottom, with a pad which consists of an elastic material and against which the inside of a spring lock washer, which is arranged in the respective groove, is supported, the spring lock washer bearing in the locked state with its outside against that surface of the holder which faces it.

The connecting chain link according to the invention provides the advantage that any wobbling of the locking element is prevented with it, by means of the spring lock washers which are arranged at the location favourable for supporting a tilting movement, even if the manufacturing tolerances maintained during the production of the connecting link are comparatively large. The elastic material forms a type of resilient bridge between the spring lock washers and the bottom of the grooves holding them.

BRIEF DESCRIPTION OF THE DRAWINGS

Further details and features of the invention emerge from the subclaims and from the following description of a particularly advantageous embodiment of the invention which is illustrated in the attached drawing, in which:

FIG. 1 shows the side view of a connecting chain link;

FIG. 2 shows a section along the line II—II in FIG. 1;

FIG. 3 shows, on an enlarged scale, the side view of the locking element for the connecting-link parts of the connecting chain link according to FIGS. 1 and 2;

FIG. 4 shows a section along the line IV—IV in FIG. 3, and

FIG. 5 shows, on a greatly increased scale, a detail in the region of the circle V in FIG. 4.

DESCRIPTION OF THE BEST MODES FOR CARRYING OUT THE INVENTION

In FIGS. 1 and 2, 1 and 2 are connecting-link parts which are of identical design and each of which has an outer limb 3 and an inner limb 4. The outer limbs 3 have three projections formed by retaining teeth 5, 6 and 7, and the inner limbs 4 have three projections formed by retaining teeth 8, 9 and 10. In order to secure the connecting-link parts 1, 2 in the position illustrated, the mutually facing sides of the ends of the inner limbs 4 form a partially cylindrical holder 11 for a locking element 12, whose design is revealed in FIGS. 3 to 4.

The locking element 12 consists of a bolt which has a central hole 13 and a transverse hole 14. Mounted in the transverse hole 14 are two balls 15, 16 which can be displaced radially outwards, with the aid of an expanding element 17, into a position in which they retain, in a slot 20 in the holder 11, a central spring lock washer 19, which is used to secure the axial position of the locking element 12 and is guided in a groove 18, as can be seen in FIG. 2. In the vicinity of its opposite ends, the locking element 12 has two further grooves 21 and 22 in which spring lock washers 23 and 24 are additionally arranged. The grooves 21 and 22 are—as is shown in FIG. 5 with reference to the groove 22—provided with a pad 25 which is formed by an elastic material which has resilient properties and can be compressed only to a limited extent. The use of polyester polyole, i.e. of an elastomer, has been tried and tested. The pad 25 ensures that the spring lock washers 23, 24 always bear against those surfaces of the holder 11 which face them. The height h of the pad 25 is expediently equal to the excess length s of the untensioned spring lock washers 23, 24 protruding over the circumference of the locking element 12, while the width a of the grooves 21, 22 is somewhat larger than the diameter d of the spring lock washers 23, 24.

What is claimed is:

1. Connecting chain link having two connecting-link parts which are locked in place in a closed position by means of a cylindrical-shaped locking element having first and second ends, said locking element being guided in an at least partially cylindrical holder formed by the connecting-link parts, said locking element being secured against axial displacements by at least one blocking element which is arranged in a central region of said locking element; said holder defining a slot, and said locking element being receivable in said slot; characterized in that the locking element (12) has proximate to each of said first and second ends, respectively, a groove (21,22); each said groove (21, 22) having a base; a pad consisting of an elastic material received in the base of each said groove; and a spring lock washer (23, 24) having an inner surface supported by said pad (25) in each said groove and oriented such that an outer surface of said spring lock washer bears against an adjacent surface of said holder (11) when said two connecting-link parts are locked in said closed position.

2. Connecting chain link according to claim 1, characterized in that said elastic material is an elastomer.

3. Connecting chain link according to claim 1, characterized in that the pad (25) has a height (h) which is equal to a distance (s) which said spring lock washers (23, 24) extend beyond the circumference of the locking element (12) when said spring lock washers are untensioned.

4. Connecting chain link according to claim 1, characterized in that the spring lock washers (23, 24) are mounted in said respective grooves (21, 22) with a clearance.

5. Connecting chain link according to one of claims 1 to 4, characterized in that the spring lock washers (23, 24) have an essentially circular cross section.

6. Connecting chain link according to claim 2, characterized in that the pad (25) has a height (h) which is equal to a distance (s) which said spring lock washers (23, 24) extend beyond the circumference of the locking element (12) when said spring lock washers are untensioned.

7. Connecting chain link according to claim 2, characterized in that the spring lock washers (23, 24) are mounted in said respective grooves (21, 22) with a clearance.

8. Connecting chain link according to claim 3, characterized in that the spring lock washers (23, 24) are mounted in said respective grooves (21, 22) with a clearance.

9. Connecting chain link according to claim 2, characterized in that the spring lock washers (23, 24) have an essentially circular cross section.

10. Connecting chain link according to claim 3, characterized in that the spring lock washers (23, 24) have an essentially circular cross section.

11. Connecting chain link according to claim 4, characterized in that the spring lock washers (23, 24) have an essentially circular cross section.

12. Connecting chain link according to claim 6, characterized in that the spring lock washers (23, 24) are mounted in said respective grooves (21, 22) with a clearance.

13. Connecting chain link according to claim 6, characterized in that the spring lock washers (23, 24) have an essentially circular cross section.

14. Connecting chain link according to claim 12, characterized in that the spring lock washers (23, 24) have an essentially circular cross section.

* * * * *

UNITED STATES PATENT AND TRADEMARK OFFICE
CERTIFICATE OF CORRECTION

PATENT NO. : 6,216,435 B1
DATED : April 17, 2001
INVENTOR(S) : Zvonimir Bogdan et al.

It is certified that error appears in the above-identified patent and that said Letters Patent is hereby corrected as shown below:

Claim 5,
Lines 1-2 (Column 2, Lines 65-66): Delete "one of claims 1 to 4", and substitute -- claim 1 --.

Signed and Sealed this

Twenty-third Day of October, 2001

Attest:

NICHOLAS P. GODICI
Attesting Officer
Acting Director of the United States Patent and Trademark Office